United States Patent [19]

Hase et al.

[11] Patent Number: 5,233,020

[45] Date of Patent: Aug. 3, 1993

[54] PAINT BINDERS

[75] Inventors: Brigitte Hase, Erkrath; Ulrich Eicken, Dusseldorf; Herbert Fischer, Duesseldorf; Horst-Jurgen Krause, Duesseldorf; Wolfgang Gress, Wuppertal; Norbert Stork, Duesseldorf, all of Fed. Rep. of Germany

[73] Assignee: Henkel Kommanditgesellschaft auf Aktien, Duesseldorf, Fed. Rep. of Germany

[21] Appl. No.: 721,514

[22] PCT Filed: Jan. 5, 1990

[86] PCT No.: PCT/EP90/00019

§ 371 Date: Jul. 12, 1991

§ 102(e) Date: Jul. 12, 1991

[87] PCT Pub. No.: WO90/08175

PCT Pub. Date: Jul. 26, 1990

[30] Foreign Application Priority Data

Jan. 13, 1989 [DE] Fed. Rep. of Germany ....... 3900859

[51] Int. Cl.$^5$ .................. C09D 179/00; C08G 73/02; C08G 73/04; C08G 73/06
[52] U.S. Cl. .................. 528/423; 528/138; 528/137; 528/424; 525/504; 106/14.5
[58] Field of Search ............... 528/423, 424, 137, 138; 106/14.5; 525/504

[56] References Cited

U.S. PATENT DOCUMENTS

| | | | |
|---|---|---|---|
| 3,737,408 | 6/1973 | Hunsucker | 528/423 |
| 4,540,747 | 9/1985 | Saegusa et al. | 528/423 |
| 4,873,293 | 10/1989 | Brode, II et al. | 528/423 |

FOREIGN PATENT DOCUMENTS

| | | | |
|---|---|---|---|
| 0048801 | 4/1982 | European Pat. Off. | 528/423 |
| 2-255725 | 10/1990 | Japan | 528/423 |
| WO9101344 | 2/1991 | World Int. Prop. O. | 528/423 |

*Primary Examiner*—John Kight, III
*Assistant Examiner*—Richard Jones
*Attorney, Agent, or Firm*—Ernest G. Szoke; Wayne C. Jaeschke; Real J. Grandmaison

[57] ABSTRACT

Poly-N-acylalkyleneimines corresponding to the following formula

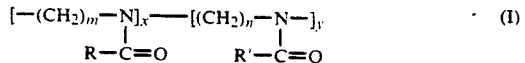

are used as an oxidatively crosslinking constituent in paints. In formula (I), R—CO represents the acyl radical of a mono- or polyunsaturated, aliphatic $C_{16-22}$ carboxylic acid or a mixture of such radicals, R'—CO represents the acyl radical of a $C_{1-22}$ carboxylic acid or a mixture of such radicals and x and y represent the percentages by weight of the particular polymer units, x assuming values of 20 to 100% and preferably 20 to 95% and y assuming values of 80 to 0% and preferably 80 to 5%. The indices m and n independently of one another may assume the value 2 or 3.

17 Claims, No Drawings

PAINT BINDERS

BACKGROUND OF THE INVENTION

1. Field of the Invention

This invention is concerned with paints and lacquers and relates to new oxidatively curing binders and to their use.

2. Discussion of Related Art

Paints are basically divided into physically drying systems and chemically drying systems. In the first case, the paint film is formed from the paint binders (film formers, resins, plasticizers) dissolved or dispersed in the solvent by evaporation of the solvent with no further chemical reaction. In the second case, application of the paint to the surface is followed by a chemical reaction which leads to crosslinking in the paint film, with the result that there is a drastic reduction in the redissolvability of the dried (cured) film compared with the original paint constituents.

One form of chemically drying paints are the oxidatively drying systems in which the crosslinking reaction is initiated by atmospheric oxygen. Oxidatively drying systems include the old oil paints and oil lacquers which contained highly unsaturated oils, such as linseed oil and soybean oil (so-called drying oils), together with siccatives (drying aids) as oxidatively crosslinking binders. However, their drying time is too long for present-day requirements. Presently the most important oxidatively curing paints are based on alkyd resins in which highly unsaturated fatty acids in the form of mixed polyesters are incorporated by condensation. To guarantee adequate quality of the paint film, the characteristic data of the alkyd precondensates which are incorporated in the paints have to be kept very constant. Naturally this involves very considerable care and effort so far as the conduct of the condensation reaction is concerned. In addition, the presence of the ester bond means that the alkyd resins remain somewhat vulnerable to hydrolysis.

The problem addressed by the present invention in this regard was to find other alternatives and to develop more suitable systems.

It has been found that this problem can be solved by addition of certain poly-N-acylalkyleneimines to the paints.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, the present invention relates to the use of poly-N-acylalkyleneimines corresponding to the following formula

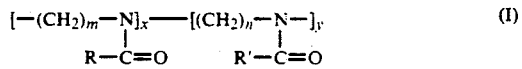

(I)

as an oxidatively crosslinking constituent in paints. In formula (I), R—CO represents the acyl radical of a mono- or polyunsaturated, aliphatic $C_{16-22}$ carboxylic acid or a mixture of such radicals, R'—CO represents the acyl radical of a $C_{1-22}$ carboxylic acid or a mixture of such radicals and x and y represent the percentages by weight of the particular polymer units, x assuming values of 20 to 100% and preferably 20 to 95% and y assuming values of 80 to 0% and preferably 80 to 5%. The indices m and n independently of one another may assume the value 2 or 3.

The poly-N-acylalkyleneimines used in paints in accordance with the invention may readily be reproducibly prepared with any composition without any particular precautions. The compounds show high stability to hydrolysis and give quick-drying films with high gloss and hardness. The composition of the poly-N-acylalkyleneimines and hence their properties may be adapted within wide limits to the requirements of the various paints, so that both paints and lacquers based on organic solvents and also water-based paints can be produced with these polymers.

The poly-N-acylalkyleneimines according to the invention are preferably used as sole binder in the paints or as the predominant component of all the binders present However, it is also possible and may even be of advantage, depending on the requirements which the paint has to satisfy, to use the poly-N-acylalkyleneimines together with relatively large percentages of other known binders, for example alkyd resins, nitrocellulose or chlorinated rubber, in mixing ratios of from about 10.1 to about 1:10. In addition to the constituents already mentioned, the paints may of course also contain any of the other auxiliaries and additives typically encountered in paints and lacquers, including for example pigments, dyes, fillers, siccatives, reactive diluents, anti-skinning agents and flow control agents. Plasticizers and resins, which are occasionally included among the binders, may also be used. The high compatibility of the poly-N-acylalkyleneimines according to the invention is an advantage in regard to mixing with other constituents.

In principle, poly-N-acylalkyleneimines corresponding to formula I may be prepared by acylation of polyalkyleneimines with carboxylic acids or carboxylic acid derivatives. More typically, however, they are prepared by cationic polymerization of $\Delta^2$-5,6-dihydro-4H-1,3-oxazines and/or $\Delta^2$-oxazolines (4,5-dihydro-1,3-oxazoles) which bear the substituents R or R' in the 2-position. Since these monomers are cyclic iminoethers, the polymers prepared therefrom are also called polyiminoethers. The name polyoxazolines is also commonly used for the polymers prepared exclusively from $\Delta^2$-oxazolines, for example by the processes described in DE 12 06 585, DE 15 70 213 or DE 19 04 540. The polymers prepared from $\Delta^2$-dihydrooxazines are known accordingly as polyoxazines The 2-substituted oxazolines may in turn be obtained, for example, from the β-chloroethylamides or from the ethanolamides of the corresponding carboxylic acids or carboxylic acid mixtures by dehydrohalogenation or dehydration. The dihydrooxazines may be similarly obtained from the propanolamides of the carboxylic acids or corresponding derivatives. Particulars can be found in the literature (see for example A. Levy and M. Litt, J. Polym. Sci. A1, 6, 1883 (1968); S. Kobayashi and T. Saegusa in Ring-Opening Polymerization Vol. 2, Ed. J. Irvin, T. Saegusa, London 1984, page 761 and also EP 88 118 090.5 and DE-P 39 14 155). The molecular weight of the polymers may be varied within wide limits primarily through the quantity of polymerization catalyst used (Brönstedt and Lewis acids, alkylating agents etc.). Low molecular weights may be obtained, even with low concentrations of catalyst, providing chain transfer agents, for example alcohols or carboxylic acids, are additionally added. Polymers having average molecular weights (weight average) in the range from 1,000 to 1,000,000 and more especially in the range from 3,000 to 50,000 are particularly suitable for the use according to the invention.

The specific production of copolymers from two or more individual 2-substituted cyclic iminoethers is also unproblematical. Since the polymerization reaction can always be continued to substantially complete conversion of the monomers, the composition of the copolymers may readily be determined through the choice of the monomer components. Where monomer mixtures are used as starting material for the polymerization, copolymers in which the individual structural units are statistically distributed are obtained. The monomer mixture may consist of individually synthesized cyclic iminoethers or, copending on the synthesis process, may even be obtained in a single step from a corresponding mixture of carboxylic acids or carboxylic acid derivatives. The second method is preferred above all when the carboxylic acids or their derivatives are prepared from natural fats or oils. If the individual cyclic iminoethers are successively introduced during the polymerization reaction, it is possible to influence the sequence of the monomer units in the polymer as far as block copolymers. The polymers are preferably produced from oxazolines, i.e. m and n in formula I preferably have the value 2.

The majority of poly-N-acylalkyleneimines suitable for use in accordance with the invention have never been described before and are therefore a subject of the invention in their own right.

According to the invention, preferred poly-N-acylalkyleneimines are those in which R—CO is the acyl radical of a natural, unsaturated $C_{16-22}$ fatty acid and/or a carboxylic acid prepared by modification of a polyunsaturated fatty acid of this type. The modification reactions in question, which may even be carried out on the final iminoether, include in particular the alkali-catalyzed displacement of one of the double bonds in linoleic acid from the 9,12-position to the 9,11- or 10,12-position (with partial cis-trans isomerization to so-called conjuene fatty acid), the alkali-catalyzed cis-trans isomerization of individual double bonds and the partial epoxidation of linoleic or linolenic acid, optionally followed by opening of the epoxide ring with addition of water or lower $C_{1-3}$ alcohols (for example methanol, ethanol, ethylene glycol). Examples of these preferred acyl radicals R—CO include those derived from the following carboxylic acids (c=cis, t=trans):
palmitoleic acid (9c-hexadecenoic acid)
petroselic acid (6c-octadecenoic acid)
oleic acid (9c-octadecenoic acid)
elaidic acid (9t-octadecenoic acid)
ricinoleic acid (12-hydroxy-9c-octadecenoic acid)
linoleic acid (9c,12c-octadecadienoic acid)
linolenic acid (9c,12c,15c-octadecatrienoic acid)
gadoleic acid (9c-eicosenoic acid)
arachidonic acid (5,8,11,14-eicosatetraenoic acid)
erucic acid (13c-docosenoic acid)
brassidic acid (13t-docosenoic acid)
clupanodonic acid (4,8,12,15,19-docosopentaenoic acid)
9,11-octadecadienoic acid (cis-trans mixture)
12-hydroxy-13-methoxy-9c-octadecenoic acid
12,13-dihydroxy-9c-octadecenoic acid Particularly preferred poly-N-acylalkyleneimines are those in which the radical R—CO is derived from the following carboxylic acids:
oleic acid
ricinoleic acid
linoleic acid
linolenic acid
erucic acid
adduct of monoepoxidized linoleic acid and water or $C_{1-3}$ alcohols The percentage by weight x of the polymer units bearing the radical R—CO in the polymer is from 20 to 100%, preferably from 20 to 95% and more preferably from 50 to 95%.

The acyl radical R'—CO different from R—CO is derived from $C_{1-22}$ carboxylic acids which may be saturated or unsaturated, aliphatic or alicyclic carboxylic acids, aromatic or araliphatic carboxylic aids which may optionally bear substituents which, like hydroxyl groups, ether groups, ester groups and halogens, do not affect the polymerization reaction of iminoethers. The following are examples of carboxylic acids from which R'—CO may be derived:
acetic acid
propionic acid
caproic acid
10-undecylenic acid
lauric acid
palmitic acid
stearic acid
2-ethyl hexanoic acid
cyclohexane carboxylic acid
benzoic acid
t-butyl benzoic acid
4-chlorobenzoic acid
phenyl acetic acid
adducts of 9,10-epoxystearic acid and water or $C_{1-3}$ alcohols, such as for example 9,10-(hydroxy, methoxy)-octadecanoic acid and ether carboxylic acids corresponding to the following formula

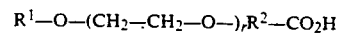

in which $R^1=C_{1-3}$ alkyl, $R^2=C_{1-3}$ alkylene, $r=0$ to 2.

The properties of the polymer may be additionally varied within wide limits through the choice of R'—CO and the percentage content of the particular unit in the polymer without any of the drying properties of these lacquer binders being lost. Thus, hydrophilic properties may be emphasized within certain limits, for example, by incorporation of short-chain acyl radicals R'—CO (derived for example from acetic acid or propionic acid), while the incorporation of long-chain aliphatic acyl radicals (derived for example from $C_{8-22}$ fatty acids) leads to increased solubility in mineral oil.

Accordingly, preferred poly-N-acylalkyleneimines are those in which the acyl radical R'—CO is derived from saturated aliphatic carboxylic acids, from $C_{2-22}$ ether carboxylic acids or from benzoic acid, more particularly from saturated $C_{8-22}$ fatty acids.

The acyl radicals derived from the following carboxylic acids are particularly preferred as R'—CO:
stearic acid
isostearic acid
palmitic acid
myristic acid
lauric acid
9,10-(hydroxy,methoxy)-octadecanoic acid behenic acid
benzoic acid.

The percentage by weight y of the polymer units bearing the radical R'—CO in the polymer is from 80 to 0%, preferably from 80 to 5% and more preferably from 50 to 5%.

High-quality paints which give films of high strength in short drying times may be produced with the poly-N-acylalkyleneimines according to the invention. The films adhere to various substrates, so that paints for metals, wood, plastics, silicate-containing building materials and other materials can be produced of this basis. These paints generally contain the poly-N-acylalkyleneimines corresponding to formula I or the preferred polymers of this type in quantities of from about 5 to about 80% by weight, although the quantities present may even be above or, in particular, below these limits, above all where the paints contain other binders in addition to the poly-N-acylalkyleneimines. Where the poly-N-acylalkyleneimines are used together with other binders it may be appropriate and advantageous to carry out the production of the poly-N-acylalkyleneimines in these other binders. In other words, in the above-described polymerization of the cyclic iminoethers, these other binders, for example alkyd resins, polyurethanes or polyacrylates, act as solvents and the mixture of binders required for the production of the paints is directly obtained. The paints preferably contain from 10 to 60% by weight of the poly]-N-acylalkyleneimines. The poly-N-acylalkyleneimines may be present in dissolved form or may even be dispersed in the solvent in addition to constituents typically encountered in paints and lacquers, such as resins, plasticizers, pigments, siccatives and other auxiliaries and additives. The quantities of solvents (water and/or organic solvents) and other constituents lie in the typical ranges for paints: solvents preferably 10 to 90% by weight and more preferably 20 to 60% by weight; other binders preferably 0 to 60% by weight and more preferably 3 to 30% by weight; pigments preferably 0 to 50% by weight and more preferably 3 to 40% by weight; other typical auxiliaries and additives preferably 0 to 60% by weight and more preferably 5 to 30% by weight, based in each case on the total weight of the paint.

EXAMPLES

A. Preparation of the poly-N-acylalkyleneimines

The starting materials used were oxazolines and dihydrooxazines substituted in the 2-position which had been produced predominantly from carboxylic acids or carboxylic acid methyl esters via the hydroxyethyl or 3-hydroxypropylamides by dehydrating cyclization in accordance with one of the earlier applications EP 88 118 090.5, DE-P 39 14 133 and DE-P 39 14 155. Even where carboxylic acid mixtures or methyl esters of carboxylic acid mixtures had been used as starting material, the iminoethers were not subjected to fractional distillation, so that the radicals R and R' in the iminoethers largely corresponded in their composition to the compositions in the carboxylic acid or methyl ester mixtures (determination by capillary gas chromatography). Carboxylic acids or methyl esters were generally used in technical grade purity; the composition of the oxazolines used based on acid mixtures (or methyl ester mixtures) of natural origin is shown in Table 1 and the composition of the dihydrooxazines in Table 2. Some other oxazolines, such as those based on ω-acetoxycaproic acid and succinic acid monomethyl ester, were prepared by the processes of A. Levy and M. Litt, J. Polm. Sci. A1 6, 1883–1894 (1968).

TABLE 1

| Oxazoline prepared from | Content of oxazolines Based on | % by weight |
|---|---|---|
| Soybean oil fatty acid (Edenor ® Sj. Henkel) | Saturated $C_{16-20}$ fatty acids | 17 |
| | Oleic acid | 26 |
| | Linoleic acid | 50 |
| | Linolenic acid | 7 |
| Ricinoleic acid (Edenor ® Ri 90, Henkel) | Palmitic acid | 2 |
| | Stearic acid | 1 |
| | Oleic acid | 5 |
| | Ricinoleic acid | 88 |
| | Linoleic acid | 4 |
| Oleic acid methyl ester (Edenor ® ME TiO5, Henkel) | Saturated $C_{12-20}$ fatty acids | 20 |
| | Oleic acid | 70 |
| | Linoleic acid | 9 |
| | Linolenic acid | 1 |
| Conjuene fatty acid (Edenor ® UKD 6010, Henkel) | Saturated $C_{14-18}$ fatty acids | 7 |
| | Oleic acid and elaidic acid | 26 |
| | Linoleic acid | 6 |
| | Mixture of 9,11-octadecadienoic acid and 10,12-octadecadienoic acid | 61 |
| Sunflower oil fatty acid (Edenor ® SbO5, Henkel) | Saturated $C_{16-22}$ fatty acids | 6 |
| | Oleic acid | 29 |
| | Linoleic acid | 64 |
| | Linolenic acid | 1 |
| Behenic acid (Edenor ® C 22 R, Henkel) | Palmitic acid and stearic acid | 5 |
| | Arachic acid | 10 |
| | Behenic acid | 81 |
| | Gadoleic acid | 1 |
| | Erucic acid | 3 |
| Erucic acid (Edenor ® U 122, Henkel) | Palmitic acid and stearic acid | 1 |
| | Oleic acid | 2 |
| | Gadoleic acid | 5 |
| | Erucic acid | 92 |
| Elaidic acid (technical) | Saturated $C_{12-20}$ fatty acids | 13 |
| | Palmitoleic acid and 9t-hexadecenoic acid | 9 |
| | Oleic acid | 18 |
| | Elaidic acid | 56 |
| | 9,12-, 9,10- and 10,11-octadecadienoic acids | 4 |
| Head-fractionated coconut oil fatty acid | Caproic acid | 2 |
| | Caprylic acid | 61 |
| | Capric acid | 34 |
| | Lauric acid | 3 |
| Hydrogentaed coconut oil fatty acid (Edenor ® HPK 12-18, Henkel) | Capric acid | 1 |
| | Lauric acid | 52 |
| | Myristic acid | 18 |
| | Palmitic acid | 10 |
| | Stearic acid | 19 |
| Fatty acids of hydrogenated rapeseed oil (Edenor ® HRa, Henkel) | Palmitic acid | 2 |
| | Stearic acid | 49 |
| | Arachic acid | 8 |
| | Behenic acid | 41 |
| Hydrogenated ricinoleic acid (Edenor ® OSSG, Henkel) | Palmitic and stearic acid | 14 |
| | 12-Hydroxystearic acid | 86 |
| Hydroxymethoxy stearic acid (from completely epoxidized oleic acid methyl ester (90%) with methanol) | 9,10-(hydroxy,methoxy)-octadecanoic acid | 90 |
| | Other saturated $C_{16-18}$ fatty acids (incl. substituted) | 10 |
| Hydroxymethoxy behenic acid (from completely epoxidized erucic acid methyl ester (92%) with methanol) | 13,14-(hydroxy,methoxy)-docosanoic acid | 92 |
| | Other saturated $C_{16-20}$ fatty acids | 8 |
| Hydroxymethoxy octadecenoic acid (from partyl epoxidized linoleic acid methyl ester (61%) with methanol) | Mixture of 9,10-(hydroxy, methoxy)-12c-octadecenoic acid and 12,13-(hydroxy, methoxy)-9c-octadecenoic acid | 45 |
| | Linoleic acid | 9 |
| | Oleic acid | 15 |
| | Saturated $C_{16-18}$ fatty acids | 31 |

TABLE 1-continued

| Oxazoline prepared from | Content of oxazolines | |
|---|---|---|
| | Based on (incl. substituted) | % by weight |

TABLE 2

| Dihydrooxazine prepared from | Content of dihydrooxazine | |
|---|---|---|
| | Based on | % by weight |
| Soybean oil fatty acid (Edenor ® Sj. Henkel) | Saturated $C_{16-20}$ fatty acids | 16 |
| | Oleic acid | 26 |
| | Linoleic acid | 51 |
| | Linolenic acid | 7 |
| Ricinoleic acid (Edenor ® Ri 90. Henkel) | Palmitic acid | 2 |
| | Stearic acid | 1 |
| | Oleic acid | 7 |
| | Ricinoleic acid | 87 |
| | Linoleic acid | 3 |
| Oleic acid methyl ester (Edenor ® ME Ti 05. Henkel) | Saturated $C_{12-20}$ fatty acids | 21 |
| | Oleic acid | 68 |
| | Linoleic acid | 10 |
| | Linolenic acid | 1 |
| Sunflower oil fatty acid (Edenor ® Sb 05. Henkel) | Saturated $C_{16-22}$ fatty acids | 6 |
| | Oleic acid | 30 |
| | Linoleic acid | 63 |
| | Linolenic acid | 1 |

The iminoethers were polymerized by various methods in solution or in the melt, in each case until conversion was complete. The polymers were obtained in the form of soft, wax-like or glass-like solids or as powders, depending on the method used for working up. The molecular weights of the end products were determined by gel permeation chromatography against polystyrene as standard and represent weight averages.

1. In a glass flask, 270 g of the oxazoline based on the soybean oil fatty acid Edenor ® Sj and 30 g of the oxazoline based on the ricinoleic acid Edenor ® Ri 90 were heated under nitrogen with 4.8 g trifluoromethane sulfonic acid methyl ester and stirred for 30 minutes at 160° C. The polymer solidified on cooling to room temperature. Its molecular weight was 11,500.

2. In a 1 liter three-necked flask, 100 g xylene and 10 g of the oxazoline based on the conjuene fatty acid Edenor ® UKD 6010, 40 g of the oxazoline based on the ricinoleic acid Edenor ® Ri 90 and 50 g of the oxazoline based on lauric acid were refluxed for 2 hours with 0.6 g 2-undecyl-2-oxazoline hydroperchlorate as catalyst. After cooling, the polymer was precipitated pouring the solution into excess methanol and isolated by centrifugation. The yield comprised 98% of the theoretical. Molecular weight 48,300.

3. In a 1 liter three-necked flask equipped with a stirrer and reflux condenser, 70 g oxazoline based on the soybean oil fatty acid Edenor ® Sj and 70 g toluene were heated under nitrogen to 120° C. together with 0.9 g trifluoromethane sulfonic acid methyl ester. After 3 hours, a 50% solution of 30 g oxazoline based on propionic acid (2-ethyl oxazoline) was added and the reaction mixture was stirred for another 3 hours at 120° C. The block copolymer formed was isolated by precipitation in excess methanol. The yield comprised 96% of the theoretical. Molecular weight 23,100.

4. 0.5% by weight trifluoromethane sulfonic acid methyl ester was added to a mixture of the oxazolines based on the sunflower oil fatty acid Edenor ® Sb 05 and isostearic acid in a ratio of 85:15 and the mixture was then pumped through a heated stainless steel tube at a rate of 75 ml/h by means of a peristaltic pump. The tube had an internal diameter of 4 mm and a length of 80 cm, 60 cm being immersed in an oil bath heated to 160° C. The polymer issuing from the end of the tube solidified on dropping under nitrogen onto an aluminium plate. The yield was quantitative. Molecular weight 31,500.

5. A 70% solution of 150 g of a mixture of oxazoline based on the soybean oil fatty acid Edenor ® Sj, oxazoline based on the behenic acid Edenor ® C 22 R and oxazoline based on hydroxymethoxy stearic acid in a ratio by weight of 3:4:3 in toluene was introduced into a 1 liter three-necked flask equipped with a stirrer and reflux condenser. After the addition of 1.2 g boron trifluoride etherate, the mixture was refluxed for 3 hours. After cooling, the product was precipitated by pouring into excess methanol and isolated by centrifugation. The yield comprised 98%. Molecular weight 18,200.

Other poly-N-acylalkyleneimines are listed in Tables 3 to 6 in which the figures represent the percentages by weight of the copolymerized iminoethers, unless otherwise stated. The iminoethers used are generally oxazolines; where dihydrooxazines were copolymerized, this is indicated by the addition (oxazine) in the mention of the carboxylic acid base. The polymers were obtained by the following variants of the production process:

I. The monomers and the catalyst were introduced into a flask in the ratios by weight shown in the Table and were heated with stirring under nitrogen for 30 minutes (90 minutes in Examples 11 and 12) to 160° C. (see also Example 1).

II. 10% of the monomer mixture shown in the Table was introduced with the total quantity of catalyst into a flask and heated with stirring under nitrogen to 120° C. The remaining 90% of the monomer mixture were added dropwise over a period of 1 hour, optionally after heating beyond the melting point, and the mixture as a whole was stirred for another hour at 120° to 140° C.

III. A mixture of monomers and catalyst as shown in the Table was pumped through a heated stainless steel tube by means of a peristaltic pump and polymerized therein as described in Example 4.

IV. The oxazoline based on soybean oil fatty acid was introduced into a flask with the total quantity of catalyst shown in the Table and heated under nitrogen to 160° C. and then stirred for 30 minutes (120 minutes in Example 25) at that temperature. In Example 17, the reaction time was 120 minutes at 120° C. In addition, the oxazolines based on soybean oil fatty acid and benzoic acid were polymerized together in this stage in Example 17. The comonomer was then added and the reaction mixture was left at the reaction temperature for another 30 minutes (or 120 minutes).

V. A 70% solution of the monomers and the catalyst in xylene was refluxed for 3 hours as in Example 2. The polymer was recovered by concentration of the solution after cooling.

The following polymerization catalysts were used:
a) trifluoromethane sulfonic acid methyl ester
b) boron trifluoride etherate
c) toluene sulfonic acid methyl ester
d) 2-undecyl-2-oxazoline hydroperchlorate
e) 2-pentadecyl-2-oxazoline-hydroperchlorate
f) N-methyl-2-phenyl oxazolinium trifluoromethane sulfonate
g) N-methyl-2-heptadecyl oxazolinium trifluoromethane sulfonate

TABLE 3

| Acyl radicals RCO or R'CO derived from | Poly-N-acylalkyleneimines Examples | | | | | | | | |
|---|---|---|---|---|---|---|---|---|---|
| | 1 | 2 | 3 | 4 | 5 | 6 | 7 | 8 | 9 |
| Soybean oil fatty acid (Sj) | 90 | | 70 | | 30 | 80 | | | 50 |
| Ricinoleic acid (Ri 90) | 10 | 40 | | | | | | | |
| Sunflower oil fatty acid (Sb 05) | | | | 85 | | | 20 | 50 | 50 |
| Conjuene fatty acid (UKD 6010) | | 10 | | | | | | | |
| Hydroxymethoxy octadecenoic acid | | | | | | 20 | 20 | | |
| Propionic acid | | | 30 | | | | | | |
| Lauric acid | | 50 | | | | | 60 | | |
| Isostearic acid | | | | 15 | | | | 20 | |
| Hydrogenated ricinoleic acid (OSSG) | | | | | | | | 20 | |
| Behenic acid (C22 R) | | | | | 40 | | | | |
| Hydroxymethoxy stearic acid | | | | | 30 | | | | |
| Benzoic acid | | | | | | | | 5 | |
| p-Chlorobenzoic acid | | | | | | | | .5 | |
| Catalyst (type) | a | d | a | a | b | c | d | a | c |
| Quantity/% by weight | 1.6 | 0.6 | 0.9 | 0.5 | 0.8 | 3.0 | 3.0 | 0.6 | 0.6 |
| Production process | I | V | III | | I | III | V | | I |
| Molecular weight/1000 | 11.5 | 48.3 | 23.1 | 31.5 | 18.2 | 6.7 | 11.1 | 29.3 | 28.9 |
| Yield/% of theoretical | 100 | 98 | 96 | 100 | 98 | 100 | 100 | 98 | 100 |

TABLE 4

| Acyl radicals RCO or R'CO derived from | Poly-N-acylalkyleneimines Examples | | | | | | | | |
|---|---|---|---|---|---|---|---|---|---|
| | 10 | 11 | 12 | 13 | 14 | 15 | 16 | 17 | 18 |
| Soybean oil fatty acid (Sj) | 35 | | | 60 | | 60 | 70 | 40 | 90 |
| Ricinoleic acid (Ri 90) | | | | 30 | | 40 | | | |
| Conjuene fatty acid (UKD 6010) | | 10 | 20 | | 20 | | | | |
| Erucic acid (U 122) | | | 20 | | | | | | |
| Elaidic acid | 35 | 10 | | | | | | | |
| Acetic acid | | | 60 | | | | | | |
| Propionic acid | | | | | | | | 55 | 10 |
| Coconut oil fatty acid, hydrogenated | | | | | 79 | | | | |
| Head-fractioned coconut oil fatty acid | | 70 | | | | | | | |
| ω-hydroxycaproic acid | | | | | 1 | | | | |
| Hydrogenated ricinoleic acid (OSSG) | | 10 | | | | | | | |
| Hydroxymethoxy stearic acid | 30 | | | | | | | | |
| Hydroxymethoxy behenic acid | | | | | | | | 30 | |
| Benzoic acid | | | | 10 | | | | 5 | |
| Catalyst (type) | a | b | c | f | b | a | c | a | c |
| Quantity/% by weight | 0.2 | 0.03 | 0.04 | 5.6 | 0.3 | 0.5 | 0.6 | 0.6 | 0.7 |
| Production process | III | I | I | I | I | I | IV | IV | V |
| Molecular weight/1000 | 84 | 510 | 375 | 5.5 | 70.4 | 30.0 | 30.4 | 15.3 | 24.5 |
| Yield/% of theoretical | 100 | 100 | 100 | 100 | 100 | 100 | 100 | 100 | 96 |

TABLE 5

| Acyl radicals RCO or R'CO derived from | Poly-N-acylalkyleneimines Examples | | | | | | | | |
|---|---|---|---|---|---|---|---|---|---|
| | 19 | 20 | 21 | 22 | 23 | 24 | 25 | 26 | 27 |
| Soybean oil fatty acid (Sj) | 20 | | | | | 50 | 70 | 100 | 50 |
| Ricinoleic acid (Ri 90) | | | | 100 | | | | | |
| Oleic acid (Ti 05) | | 30 | | | | | | | |
| Sunflower oil fatty acid (Sb 05) | | | | | 100 | 10 | | | |
| Conjuene fatty acid (UKD 6010) | 20 | | 30 | | | | | | |
| Dihydroxyoctadecenoic acid | | 50 | | | | | | | |
| Capric acid | | 20 | 50 | | | | | | |
| Palmitic acid | 50 | | | | | | | 30 | |
| Stearic acid | | | 20 | | | | | | 50 |
| Fatty acid from hydrogenated rapeseed oil | | | | | | 30 | | | |
| ω-Acetoxy caproic acid | | | | | | 10 | | | |
| Succinic acid monomethyl ester | 10 | | | | | | | | |
| Catalyst (type) | e | c | g | a | b | c | e | a | a |
| Quantity/% by weight | 2.9 | 2.0 | 0.4 | 0.8 | 0.7 | 4.6 | 0.04 | 0.5 | 0.5 |
| Production process | V | II | I | III | III | II | IV | V | I |
| Molecular weight/1000 | 14.2 | 10.5 | 112 | 20.5 | 18.5 | 4.9 | 890 | 28.5 | 29.1 |
| Yield/% of theoretical | 97 | 100 | 100 | 100 | 100 | 100 | 100 | 97 | 100 |

TABLE 6

| Acyl radicals RCO or R'CO derived from | Poly-N-acylalkyleneimines Examples | | | | | | | | |
|---|---|---|---|---|---|---|---|---|---|
| | 28 | 29 | 30 | 31 | 32 | 33 | 34 | 35 | 36 |
| Soybean oil fatty acid (Sj) | | 85 | 65 | 65 | 70 | 80 | 70 | 70 | 60 |
| Soybean oil fatty acid (Sj) (oxazine) | 75 | | 25 | | | | | | |
| Ricinoleic acid (Ri 90) (oxazine) | | | | | 10 | | | | |
| Sunflower oil fatty acid (Sb 05) (oxazine) | | | | | | | | | 20 |
| Oleic acid (Ti 05) (oxazine) | | | | | | | 20 | | |
| Lauric acid (oxazine) | | | | 35 | | | | | |
| Benzoic acid | 25 | | 10 | | 20 | | | 10 | 20 |
| Benzoic acid (oxazine) | | | | | | | 30 | | |
| 3,6,9-trioxadecanoic acid | | 15 | | | | | | | |
| 3,6,9-trioxadecanoic acid (oxazine) | | | | | | | | 20 | |
| Catalyst (type) | b | c | a | a | b | c | a | c | c |
| Quantity/% by weight | 0.6 | 1.4 | 0.6 | 1.2 | 0.6 | 0.6 | 0.7 | 0.8 | 0.7 |
| Production process | III | III | I | I | I | II | II | I | II |
| Molecular weight/1000 | 27 | 20 | 29 | 14 | 26 | 31 | 24 | 25 | 25 |
| Yield/% of theoretical | 100 | 100 | 100 | 100 | 100 | 100 | 100 | 100 | 100 |

B. Use of the poly-N-acyl alkyleneimines in lacquers and paints

37.–48. Solvent-based clear lacquers

In these Examples, paints having the following composition were prepared by mixing the components at room temperature or with gentle heating.

- 65.0 g poly-N-acylalkyleneimine according to the invention
- 0.5 g cobalt siccative, 6% by weight Co (Octa-Soligen-Co, Borchers)
- 2.5 g zirconium siccative, 6% by weight Zr (Octa-Soligen-Zr, Borchers)
- 2.0 g butanone oxime
- 30.0 g Kristalloel 30 (Shell)

The homogeneous paints which were liquid at room temperature were knife-coated onto glass plates or stainless steel plates and then dried in air at room temperature. The film remaining after drying had a layer thickness of approximately 30 μm and showed firm adhesion and elasticity in every case. Table 7 shows the König pendulum hardness (according to the German standard DIN 53 157), the impact indentation (on metal plate, reverse, according to the US standard ASTM-D 2795-69) and the gloss (visual) measured after different drying times (1 to 14 days) for paints containing various poly-N-acylalkyleneimines.

The measured values clearly show that lacquers having very good properties can be produced with the poly-N-acylalkyleneimines according to the invention.

TABLE 7

| Example | Poly-N-acyl-alkyleneimine according to Example | Substrate | Gloss | Pendulum hardness in sec after 1 d | 7 d | 14 d | Impact indentation/ inch × pound |
|---|---|---|---|---|---|---|---|
| 37 | 1 | Glass | High | 42 | 50 | 60 | |
| 38 | 3 | Glass | High | 28 | 43 | 47 | |
| 39 | 9 | Glass | High | 42 | 40 | 45 | |
| 40 | 15 | Glass | High | 40 | 46 | 48 | |
| 41 | 18 | Glass | High | 53 | 70 | 71 | |
| 42 | 22 | Glass | High | 13 | 28 | 32 | |
| 43 | 26 | Glass | High | 65 | 71 | 74 | |
| 44 | 27 | Glass | High | 34 | 50 | 58 | |
| 45 | 28 | Glass | High | 16 | 24 | 32 | |
| 46 | 29 | Glass | High | 29 | 31 | 36 | |
| 47 | 30 | Glass | High | 19 | 35 | 53 | |
| 48 | 31 | Glass | High | 18 | 49 | 53 | |
| 37 | 1 | Metal | High | | 55 | | >80 |
| 40 | 15 | Metal | High | | 46 | | >80 |

49.–50. Solvent-based white paints

To produce these paints, the poly-N-acylalkyleneimines according to Examples 1 to 15 were dissolved in a mixture of aromatic hydrocarbons (boiling range 162°–176° C., Solvesso® 100) to form 70% solutions. The pigment and some other additives were then introduced into the solutions and grinding pastes (a) having the following composition (parts by weight) were prepared therefrom by dispersion in a dissolver to a particle size below 10 μm:

| | 49a | 50a |
|---|---|---|
| Poly-N-acylalkyleneimine according to Example 1 (70% solution) | 117.5 | |
| Poly-N-acylalkyleneimine according to Example 15 (70% solution) | | 108.5 |
| Calcium octoate (4%) | 4.6 | 4.3 |
| Wetting agent (nonionic, 50%) | 4.6 | 4.2 |
| White spirit (boiling range 145–200° C.) | 73.2 | 67.8 |
| Titanium dioxide (rutile) | 303.1 | 280.2 |

The grinding pastes were then processed with addition of a mixture (b) of the following components (in parts by weight) to form spreadable white paints:

| | 49b | 50b |
|---|---|---|
| Poly-N-acylalkyleneimine according to Example 1 (70% solution) | 459.0 | |
| Poly-N-acylalkyleneimine according to Example 15 (70% solution) | | 424.5 |
| Butanone oxime | 7.1 | 6.6 |
| Lead octoate solution (24% Pb) | 7.2 | 3.9 |
| Zirconium octoate solution (6% Zr) | 4.2 | 3.8 |
| Cobalt octoate solution (6% Co) | 1.8 | 1.7 |
| Solvesso® 100 | 10.2 | 47.2 |
| White spirit (145–200° C.) | 10.5 | 47.3 |
| White paint (total) | 1,000 | 1,000 |

To test the film properties, both paints were knife-coated onto glass plates or sprayed onto deep-drawn iron plates and then dried in air at room temperature. The tests applied and the test results are shown in Table 8.

The measured values clearly show that pigmented paints based on the poly-N-acylalkyleneimines according to the invention are also of outstanding quality.

TABLE 8

| | Example 49 | Example 50 |
|---|---|---|
| Poly-N-acylalkyleneimine according to Example | 1 | 15 |
| Viscosity of the paint after 40 days (ICI Cone & Plate Viscosimeter: mPas) at 25° C.) | 550 | 560 |
| On Glass Pendulum hardness (DIN 53 157) in sec | | |
| after 3 days | 44 | 34 |
| after 14 days | 54 | 80 |
| after 48 days | 84 | 80 |
| Gloss (reflectometer values 60° according to DIN 53 151) | 81 | 82 |
| On deep-drawn plate Pendulum hardness (DIN 53 157) in sec after 44 days | 59 | 51 |
| Erichsen indentation test (DIN 53 156) in mm after 44 days | 8.4 | 8.7 |

51. Water-based paint 71.5 g of a 70% solution of the poly-N-acylalkyleneimine of Example 17 in isopropanol were introduced with stirring into 200 ml water. 104.5 g isopropanol and water were then distilled off from the mixture in vacuo, resulting in the formation of a stable dispersion. Finally, the dispersion was stirred with 0.18 g cobalt siccative (Servosyn® WEB, 8% Co, Servo BV, Delden, NL) and 0.63 g zirconium siccative (Servosyn® WEB, 12% Zr, Servo BV, Delden, NL).

To test the film properties, the water-based paint was knife-coated onto deep-drawn iron plates and dried thereon in air at room temperature. Dust dryness was achieved after 2 h. After 14 days, the pendulum hardness (DIN 53 157) of the high-gloss film (thickness 50 μm) was already 78 s.

52. Paint based on poly-N-acylalkyleneimine/alkyd resin

As in Examples 34–45, a solvent-based clear lacquer was prepared by mixing the following components:

32.5 g poly-N-acylalkyleneimine according to Example 26

43.3 g alkyd resin Alkydal® 681 (75% in white spirit, Bayer AG)
0.5 g cobalt siccative
2.5 g zirconium siccative
2.0 g butanone oxime
19.2 g Kristallöl 30

The clear lacquer liquid at room temperature was knife-coated onto glass plates and, after drying in air, gave a high-gloss film having a thickness of approximately 30 μm and pendulum hardness values of 35 s after 1 d, 53 s after 7 d and 80 s after 14 d.

We claim:

1. The process of painting a surface consisting of applying to said surface a paint composition containing an oxidatively crosslinking constituent, said constituent consisting of a poly-N-acylalkyleneimine corresponding to formula I

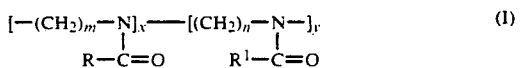
(I)

in which R—CO is selected from the group consisting of the acyl radical of a mono- or polyunsaturated, aliphatic $C_{16-22}$ carboxylic acid and a mixture of said radicals, $R^1$—CO is selected from the group consisting of the acyl radical of a $C_{1-22}$ carboxylic acid and a mixture of said radicals, m and n independently of one another have the value 2 or 3, x and y represent the percentages by weight of the particular polymer units, x having a value of about 20 to about 100% and y having a value of about 80 to 0%.

2. The process as in claim 1 wherein x has a value of about 20 to about 95%, and y has a value of about 80 to about 5%.

3. The process as in claim 1 wherein x has a value of about 50 to about 95%, and y has a value of about 50 to about 5%.

4. The process as in claim 1 wherein m and n each have the value of 2.

5. The process as in claim 1 wherein said R—CO is an acyl radical derived from the group consisting of palmitoleic acid, petroselic acid, oleic acid, elaidic acid, ricinoleic acid, linoleic acid, linolenic acid, gadoleic acid, arachidonic acid, erucic acid, brassidic acid, clupanodonic acid, conjuene fatty; acid, adducts of monoepoxidized linoleic acid and water or a $C_{1-3}$ alcohol, and a mixture thereof.

6. The process as in claim 1 wherein said poly-N-acylalkyleneimine has an average molecular weight of about 1,000 to about 1,000,000.

7. The process as in claim 1 wherein said poly-N-acylalkyleneimine has an average molecular weight of about 3,000 to about 50,000.

8. The process as in claim 1 wherein said poly-N-acylalkyleneimine is present in an amount of from about 5 to about 80% by weight, based on the weight of said paint composition.

9. The process as in claim 1 wherein said R'—CO is an acyl radical derived from the group consisting of acetic acid, propionic acid, caproic acid, 10-undecylenic acid, lauric acid, palmitic acid, stearic acid, 2-ethyl hexanoic acid, cyclohexane carboxylic acid, benzoic acid, t-butyl benzoic acid, 4-chlorobenzoic acid, phenyl acetic acid, adducts of 9,10-epoxy-stearic acid and water or a $C_{1-3}$ alcohol, and a mixture thereof.

10. A paint composition containing from about 5 to about 80% by weight, based on the weight of said paint, or an oxidatively crosslinking constituent, said constituent consisting of a poly-N-acylalkyleneimine corresponding to formula I

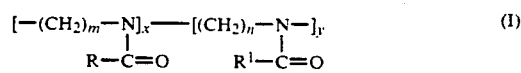
(I)

in which R—CO is selected from the group consisting of the acyl radical of a mono- or polyunsaturated, aliphatic $C_{16-22}$ carboxylic acid and a mixture of said radicals, $R^1$—CO is selected from the group consisting of the acyl radical of a $C_{1-22}$ carboxylic acid and a mixture of said radicals, m and n independently of one another have the value 2 or 3, x and y represent the percentages by weight of the particular polymer units, x having a value of about 20 to about 100% and y having a value of about 80 to 0%.

11. A paint composition as in claim 10 wherein x has a value of about 20 to about 95%, and y has a value of about 80 to about 5%.

12. A paint composition as in claim 10 wherein x has a value of about 50 to about 95%, and y has a value of about 50 to about 5%.

13. A paint composition as in claim 10 wherein m and n each have the value of 2.

14. A paint composition as in claim 10 wherein said R—CO acyl radical is derived from the group consisting of palmitoleic acid, petroselic acid, oleic acid, elaidic acid, ricinoleic acid, linoleic acid, linolenic acid, gadoleic acid, arachidonic acid, erucic acid, brassidic acid, clupanodonic acid, conjuene fatty acid, adducts of monoepoxidized linoleic acid and water or a $C_{1-3}$ alcohol, and a mixture thereof.

15. A paint composition as in claim 10 wherein said poly-N-acylalkyleneimine has an average molecular weight of about 1,000 to about 1,000,000.

16. A paint composition as in claim 10 wherein said poly-N-acylalkyleneimine has an average molecular weight of about 3,000 to about 50,000.

17. A paint composition as in claim 10 wherein said R'—CO acyl radical is derived from the group consisting of acetic acid, propionic acid, caproic acid, 10-undecylenic acid, lauric acid, palmitic acid, stearic acid, 2-ethyl hexanoic acid, cyclohexane carboxylic acid, benzoic acid, t-butyl benzoic acid, 4-chlorobenzoic acid, phenyl acetic acid, adducts of 9,10-epoxy-stearic acid and water or a $C_{1-3}$ alcohol, and a mixture thereof.

* * * * *